United States Patent
Desai et al.

(10) Patent No.: US 10,536,072 B2
(45) Date of Patent: Jan. 14, 2020

(54) VOLTAGE CONVERSION AND CHARGING FROM LOW BIPOLAR INPUT VOLTAGE

(71) Applicant: Texas Instruments Incorporated, Dallas, TX (US)

(72) Inventors: Nachiket Venkappayya Desai, Portland, OR (US); Yogesh Kumar Ramadass, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/944,833

(22) Filed: Apr. 4, 2018

(65) Prior Publication Data
US 2018/0226883 A1    Aug. 9, 2018

Related U.S. Application Data

(63) Continuation of application No. 14/180,945, filed on Feb. 14, 2014, now Pat. No. 9,966,838.
(Continued)

(51) Int. Cl.
*H02M 3/335*    (2006.01)
*H02M 1/36*    (2007.01)

(52) U.S. Cl.
CPC ......... *H02M 1/36* (2013.01); *H02M 3/33507* (2013.01); *H02M 3/33523* (2013.01)

(58) Field of Classification Search
CPC ............ H02M 3/22; H02M 3/24; H02M 3/28; H02M 3/325; H02M 3/335; H02M 3/33507; H02M 3/33523; H02M 3/33515; H02M 3/3353; H02M 3/33538; H02M 3/33546; H02M 3/33553; H02M 3/3381;
(Continued)

(56) References Cited

U.S. PATENT DOCUMENTS 3,702,961 A    11/1972   Erickson
6,340,787 B1 *   1/2002   Simeray ................ G04C 10/00
                                                      136/201

(Continued)

OTHER PUBLICATIONS

J. Damaschke, "Design of a Low-Input-Voltage Converter for Thermoelectric Generator", IEE Transactions on Industry Applications, vol. 33, No. 5, 1997, pp. 1203-1207.
(Continued)

*Primary Examiner* — Gary L Laxton
*Assistant Examiner* — Carlos O Rivera-Perez
(74) *Attorney, Agent, or Firm* — Tuenlap Chan; Charles A. Brill; Frank D. Cimino

(57) ABSTRACT

A circuit includes a transformer configured with a primary winding and a secondary winding that are driven from a voltage supplied by a thermoelectric generator (TEG). The circuit includes a bipolar startup stage (BSS) coupled to the transformer to generate an intermediate voltage. The BSS includes a first transistor device coupled in series with the primary winding of the transformer to form an oscillator circuit with an inductance of the secondary winding when the voltage supplied by the TEG is positive. A second transistor device coupled to the secondary winding of the transformer enables the oscillator circuit to oscillate when the voltage supplied by the TEG is negative. After startup, a flyback converter stage can be enabled from the intermediate voltage to generate a boosted regulated output voltage.

20 Claims, 5 Drawing Sheets

Related U.S. Application Data

(60) Provisional application No. 61/767,120, filed on Feb. 20, 2013, provisional application No. 61/767,129, filed on Feb. 20, 2013.

(58) Field of Classification Search
CPC ...... H02M 3/338; H02M 3/3385; H02M 1/32; H02M 1/36; H02M 2001/0006; H02M 2001/0032; H02M 7/5388; H02M 7/5383; H02M 7/53838; H02M 7/5387; H02M 7/53846; H02M 7/53862; H02M 7/538466
USPC .......... 363/15–21.18, 22, 40–43, 49, 63, 89, 363/95–99, 123–134; 323/205–211, 323/222–226, 247, 266, 271–276, 323/282–288, 311–313, 351, 901, 908, 323/909; 331/8, 12, 57, 68, 69, 70–73, 331/107, 108 R–108 D, 132, 134–137, 331/165–171
See application file for complete search history.

(56) References Cited

U.S. PATENT DOCUMENTS

| | | |
|---|---|---|
| 7,705,575 B2 | 4/2010 | Akyildiz et al. |
| 2007/0279945 A1 | 12/2007 | Salato |
| 2008/0205099 A1 | 8/2008 | Chung et al. |
| 2010/0195360 A1 | 8/2010 | Salerno et al. |
| 2010/0208498 A1 | 8/2010 | Rubio et al. |
| 2011/0075450 A1 | 3/2011 | Shimada |
| 2012/0300506 A1 | 11/2012 | Lee et al. |
| 2013/0063982 A1 | 3/2013 | Ye et al. |

OTHER PUBLICATIONS

J. Im, "A 40 mV Transformer-Reuse Self-Startup Boost Converter With MPPT Control for Thermoelectric Energy Harvesting", IEEE Journal of Solid-State Circuit, vol. 47, No. 12, Dec. 2012, pp. 3055-3067.

* cited by examiner

VOLTAGE CONVERSION AND CHARGING FROM LOW BIPOLAR INPUT VOLTAGE

CROSS-REFERENCE TO RELATED APPLICATION

This continuation application claims the benefit of priority to U.S. patent application Ser. No. 14/180,945, filed on Feb. 14, 2014, which claims the benefit of U.S. Provisional Patent Application 61/767,120 filed on Feb. 20, 2013, and entitled CIRCUIT AND METHOD FOR A COMPLETELY ELECTRONIC STARTUP FROM EXTREMELY LOW POSITIVE OR NEGATIVE INPUT VOLTAGES. This application also claims the benefit of U.S. Provisional Patent Application 61/767,129 filed on Feb. 20, 2013, and entitled CIRCUIT AND METHOD FOR FAST AND EFFICIENT CHARGING FROM EXTREMELY LOW POSITIVE OR NEGATIVE INPUT VOLTAGES. The entirety of each of the above-identified applications is incorporated by reference herein.

TECHNICAL FIELD

This disclosure relates to a voltage regulator circuit, and more particularly to a boost converter circuit for thermoelectric harvesting having self-starting capability from a de-energized state.

BACKGROUND

Advances in low-power biomedical and industrial sensor designs have made energy harvesting an attractive alternative to batteries for powering implanted or otherwise hard-to-reach sensors. Such constraints on the location of these sensors also precludes the use of solar or vibration energy harvesters as a source of energy. Thermal energy harvesting is a suitable alternative due to the presence of reasonable thermal gradients in industrial settings, or between the human body and the environment, for example. Thermoelectric generators (TEGs) can be employed for thermal energy harvesting and are capable of powering downstream electronic circuits from the TEG.

Bulk-mode TEGs typically produce 20-30 mV for every one Kelvin of temperature difference across them, with an output impedance as low as two ohms. Harvesting energy using these devices usually implies working off an output voltage as low as 50 mV in the worst case, where the temperature difference across the device is about two Kelvin. Boost converters are typically used to convert these voltages sufficiently to where CMOS circuits can subsequently be powered, for example. Starting up these converters proves to be a significant challenge since most switches in the converters have threshold voltages far exceeding the output of the TEG. In one example, this problem has been addressed by incorporating a battery to operate the switches during startup. Alternatively, a motion-activated mechanical switch can be employed. These approaches can significantly increase the cost and complexity of circuit integration and implementation, however.

In addition to the low output voltage magnitude produced by TEG's, the polarity of the induced voltage output depends on the direction of heat flow, which can vary across different applications or within the same application. Two separate transformer-based oscillators can be used in some applications for both low-voltage startup and steady-state operation—one each for each polarity. A transformer-based oscillator for startup and a transformer-based boost converter can be used in other applications, leading to higher efficiency but only with the capability to support a single polarity. Using multiple transformers also can increase the cost and complexity of a given circuit implementation.

SUMMARY

This disclosure relates to a boost converter circuit for thermoelectric harvesting having self-starting capability from a de-energized state.

In one example, a circuit includes a transformer configured with a primary winding and a secondary winding that are driven from a voltage supplied by a thermoelectric generator (TEG). The circuit includes a bipolar startup stage (BSS) operatively coupled to the transformer to generate an intermediate voltage greater than the voltage supplied by the TEG. The BSS includes a first transistor device operatively coupled in series with the primary winding of the transformer to form an oscillator circuit with an inductance of the secondary winding when the voltage supplied by the TEG is positive. A second transistor device operatively coupled to the secondary winding of the transformer enables the oscillator circuit to oscillate when the voltage supplied by the TEG is negative.

In another example, a circuit includes a transformer configured with a primary winding and a secondary winding that are driven from a voltage supplied by a thermoelectric generator (TEG). A flyback converter stage (FCS) is operatively coupled to the transformer to generate an output voltage greater than the voltage supplied by the TEG. A first transistor device is operatively coupled in series with the primary winding of the transformer to excite the primary winding and to generate an AC output on the secondary winding when the output voltage is below a predetermined threshold. A second transistor device can be operatively coupled in parallel with the first transistor device. The second transistor device is operatively coupled in series with the primary winding of the transformer to excite the primary winding and to generate an AC output on the secondary winding when the output voltage is above the predetermined threshold.

In another example, a circuit includes a transformer configured with a primary winding and a secondary winding that are driven from a voltage supplied by a thermoelectric generator (TEG). A bipolar startup stage (BSS) is operatively coupled to the transformer to generate an intermediate voltage greater than the voltage supplied by the TEG. The BSS includes a first transistor device operatively coupled in series with the primary winding of the transformer to form an oscillator circuit with an inductance of the secondary winding when the voltage supplied by the TEG is positive. A second transistor device is operatively coupled in series with the secondary winding of the transformer to enable the oscillator circuit to oscillate when the voltage supplied by the TEG is negative. The circuit includes a flyback converter stage (FCS) operatively coupled to the transformer to generate an output voltage greater than the intermediate voltage supplied by the BSS. The FCS includes a third transistor device operatively coupled in series with the primary winding of the transformer to excite the primary winding and to generate an AC output on the secondary winding when the output voltage is below a predetermined threshold. The FCS also includes a fourth transistor device operatively coupled in parallel with the third transistor device, the fourth transistor device operatively coupled in series with the primary winding of the transformer to excite the primary winding and to generate an AC output on the secondary winding when the output voltage is above the predetermined threshold.

DETAILED DESCRIPTION

This disclosure relates to a boost converter circuit for thermoelectric harvesting having self-starting capability from a de-energized state. A circuit topology is provided that employs a single transformer in an oscillator circuit that operates as a self-starting oscillator when starting up from small positive or negative input voltages supplied by a thermoelectric generator (TEG). After startup, the transformer oscillator functionality is disabled and the same transformer is then multiplexed through different operating modes (e.g., via control circuits) until a steady state output voltage has been attained. As used herein, the term multiplexed refers to using control circuits to operate the transformer in one mode such as oscillation mode during startup and then automatically reconfigure the transformer into another mode such as boost converter mode (also referred to as flyback mode) after startup. Thus, the single transformer can be multiplexed between different circuit configurations as the converter proceeds through startup transients until steady-state operation has been achieved while operating from an input of either polarity.

During the initial phase of startup, the converter operates as an oscillator satisfying the oscillation criteria for bipolar inputs and charges a low-capacitance intermediate node. After a voltage threshold has been attained at the intermediate node, a lower-efficiency intermediate flyback stage can then be employed to speed up the startup process and begin charging a high-capacitance output node. A sub-regulator (e.g., a regulator that regulates internal voltages within the boost converter circuit) can be activated when the voltage on the high-capacitance node has attained an intermediate voltage threshold to further facilitate the charging process. A high-efficiency main flyback stage can then be activated upon charging the high-capacitance output node to a suitable level. Both flyback stages and the oscillator share the same multiplexed transformer which mitigates circuit costs. Bipolar operation of the flyback converter can be achieved by flux commutation in the transformer core by resonating the self-inductance of the primary with its parasitic capacitance.

Figure 1:
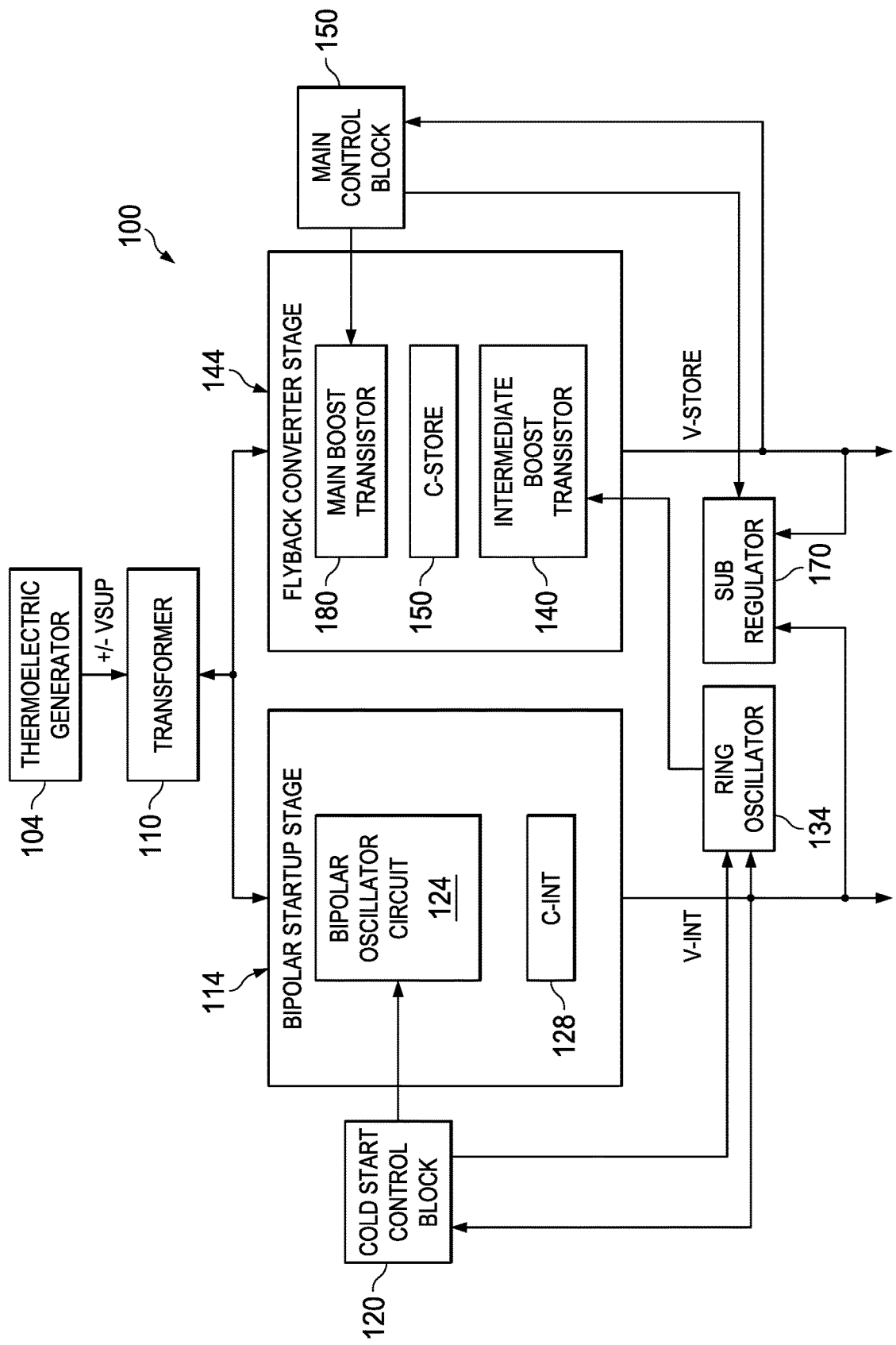
FIG. 1 illustrates an example of schematic block diagram of a bipolar startup and boost converter circuit to regulate a voltage supplied by a thermoelectric generator.

FIG. 1 illustrates an example of schematic block diagram of a bipolar startup and boost converter circuit 100 to regulate a voltage supplied by a thermoelectric generator 104. As used herein, the term circuit can include a collection of active and/or passive elements that perform a circuit function, such as a voltage regulator or the like. The term circuit can also include an integrated circuit where all the circuit elements are fabricated on a common substrate, for example. The circuit 100 includes a transformer 110 configured with a primary winding and a secondary winding that are driven from a voltage VSUP supplied by the thermoelectric generator (TEG) 104. The voltage VSUP from the TEG 104 can be a positive or negative polarity depending on the direction of heat flow that is sensed by the TEG. During startup of the circuit 100, a bipolar startup stage (BSS) 114 is engaged with the transformer 110 via a cold start control block 120 to generate an intermediate voltage V-INT that is greater than the voltage supplied by the TEG 104. The BSS 114 includes a bipolar oscillator circuit 124 (e.g., FET and/or junction transistors) that operate in conjunction with the transformer 110 during the startup phase of the circuit 100 to form an oscillator circuit to charge an intermediate capacitance node shown as C-INT 128. Output from C-INT 128 provides the voltage V-INT.

As will be illustrated and described below with respect to FIG. 3, a first transistor device in the bipolar oscillator circuit 124 can be coupled in series with the primary winding of the transformer 110 to form a self-starting oscillator circuit with an inductance of the secondary winding when the voltage supplied by the TEG 104 is positive. The self-starting oscillator circuit formed by the bipolar oscillator circuit 124 and transformer 110 can be considered a variation of a Meissner oscillator or Armstrong oscillator, for example. If a conventional Meissner configuration were employed with the transformer 110, where only a single transistor were employed in the oscillator circuit, then oscillations would stop when VSUP from the TEG 104 changes to negative. Thus, a second transistor in the bipolar oscillator circuit 124 can be coupled to the secondary winding of the transformer to enable the oscillator circuit to oscillate when the voltage supplied by the TEG is negative. The second transistor operates to provide a 180 degree phase shift to maintain oscillation when VSUP from the TEG 104 is negative as will be described below. Other transistors in the bipolar oscillator circuit 124 can be employed to enable and disable operations of the BSS 114 as will be illustrated and describe below with respect to FIG. 3.

The cold start control block (CSCB) 120 monitors V-INT until a predetermined threshold is attained (e.g., 0.6 V). The CSCB 120 can include discrete monitors (e.g., comparators) and output drivers to monitor the V-INT threshold and enable/disable the bipolar oscillator circuit 124. This can also include a controller that executes instructions to operate the CSCB 120. When the V-INT threshold has been exceeded, the CSCB 120 disables the bipolar oscillator circuit 124 and activates a ring oscillator 134 that is also powered from V-INT. In one example, the ring oscillator 134 can be an oscillator circuit composed of an odd number of NOT gates whose output oscillates between two voltage levels, representing true and false. The NOT gates, or inverters, can be attached in a chain where the output of the last inverter is fed back into the first.

When the ring oscillator 134 is activated, an intermediate boost transistor 140 is cycled (e.g., turned off and on) in a flyback converter stage 144 in response to the ring oscillator. The flyback converter stage 144 operates with the transformer 110 to boost the voltage on a larger capacitance C-STORE 150 which supplies voltage to output V-STORE. Bipolar operation of the flyback converter 144 can be achieved by flux commutation in the transformer core by resonating the self-inductance of the primary with its parasitic capacitance. During initial charging of C-STORE 150, the intermediate boost transistor 140 is activated since it operates at a lower threshold voltage that can be supported by the ring oscillator 134. As the ring oscillator 134 oscillates, the voltage V-INT can drop below the V-INT threshold. Thus, the ring oscillator 134 can be disabled and the bipolar oscillator circuit 124 reactivated to boost the voltage on C-INT 128 and correspondingly drive V-INT back above the V-INT threshold. During this time of transition between charging states, C-STORE 150 can be decoupled from the output V-STORE and thus hold its charge from the previous charging cycle applied by the intermediate boost transistor 140 and transformer 110.

As V-STORE rises above an intermediate threshold, portions of a main control block (MCB) 160 monitoring V-STORE can activate a sub-regulator 170 which regulates a voltage between V-STORE and V-INT. By activating, the sub-regulator 170, the charging time of C-STORE 150 can be reduced. The sub-regulator 170 can be a linear regulator, in one example, although other regulator types can be utilized as the sub-regulator. After V-STORE has risen above a V-STORE threshold set by the MCB 160, the ring oscillator 134, intermediate transistor 140, and bipolar startup stage 114 can be disabled. The MCB 160 can then cycle (e.g., turn-off and turn-on) a main boost transistor 180 that is coupled in parallel with the intermediate boost transistor 140 and is now employed to operate the flyback converter stage 144 with the transformer 110.

Like the intermediate boost transistor 140, the main boost transistor 180 is coupled in series with the primary winding of the transformer 110 to excite (e.g., via current flow through) the primary winding and to generate an AC output on the secondary winding when the regulated output voltage V-STORE is above the predetermined threshold set for V-STORE. The main boost transistor 180 operates at a higher turn-on threshold than the intermediate boost transistor 140. The higher threshold operation promotes greater efficiency in the flyback converter stage 144 after V-STORE has risen sufficiently (e.g., as determined by thresholds). After V-STORE has risen above the V-STORE threshold, the sub-regulator 170 can be deactivated by the MCB 160. As will be illustrated and described below with respect to FIG. 4, a single output rectifier (e.g., diode) can be employed at the output of the secondary of the transformer 110 to generate a DC charging current for C-STORE 150 in the flyback converter stage 144. After charging C-STORE 150, the regulated output voltage V-STORE can then be employed to power other electronic circuits (e.g., batteries, regulators, controllers, monitors, sensors, and so forth).

Figure 2:
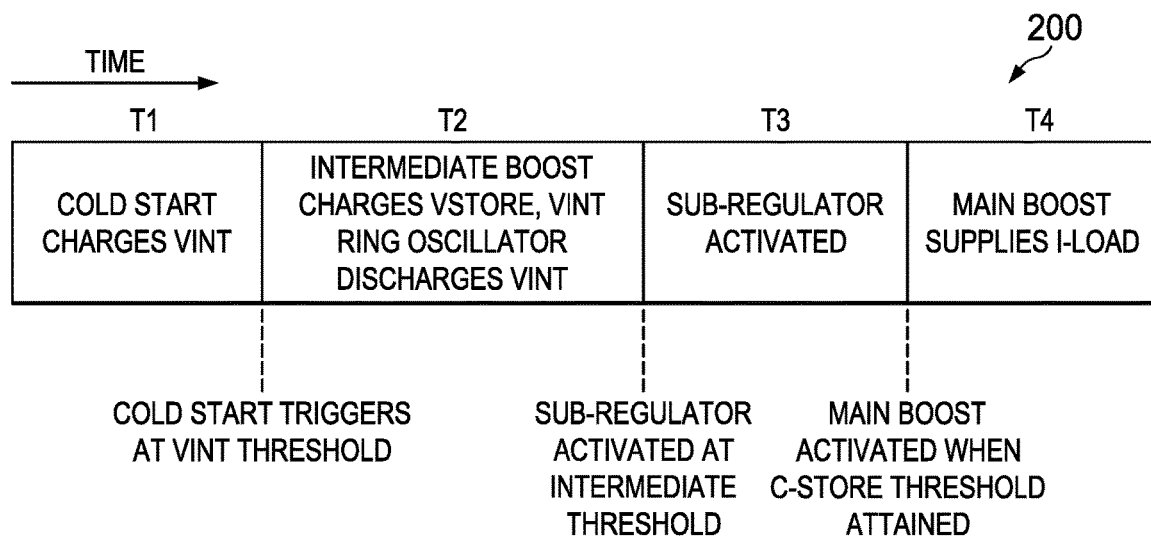
FIG. 2 illustrates an example phase diagram that illustrates the various phases that can be executed by the bipolar startup and boost converter circuit of FIG. 1.

FIG. 2 illustrates an example phase diagram 200 that illustrates the various phases that can be implemented by the bipolar startup and boost converter circuit described above with respect to FIG. 1. The different phases of the diagram 200 are shown with respect to time which flows horizontally from left to right on the diagram. Four time periods, T1, T2, T3, and T4 describe the time periods the respective phases of the diagram 200, are active. At T1, during cold start (e.g., in the absence of a battery), the bipolar oscillator charges CINT. When V-INT crosses a cold start power-on threshold (e.g., V-INT at about 0.6V), the flyback converter is then operated in intermediate-boost mode during time period T2 to charge C-STORE until V-INT falls below a threshold (e.g., a hysteretic threshold). The bipolar oscillator then takes over again during T2 to charge C-INT back to the power on threshold level. During this period of T2, there is minimal leakage current from C-STORE since the main sensing and control circuits have not been activated, and hence C-STORE holds most of its stored charge.

The charging rate of C-STORE can be further increased by connecting C-STORE and C-INT through a sub-regulator when V-STORE exceeds V-INT by an intermediate threshold voltage beginning at time period T3. The charging action of C-STORE speeds up at a higher rate when the sub-regulator is activated. When the capacitor C-STORE is charged to a threshold of about 1.8 V, the main control block 160 activates the main oscillator (e.g., main boost transistor in flyback oscillator) and other control circuits are activated while the main primary side transistor is utilized. The control circuits for the main flyback converter can operate at about 2 kHz, for example, although other frequencies are possible. Upon reaching steady state operation, the bipolar oscillator 124, the cold start control block 120 and the ring oscillator 134 driving the low-efficiency flyback converter (e.g., intermediate boost transistor) are disabled using PMOS gating switches, for example, to reduce loss in the converter.

Figure 3:
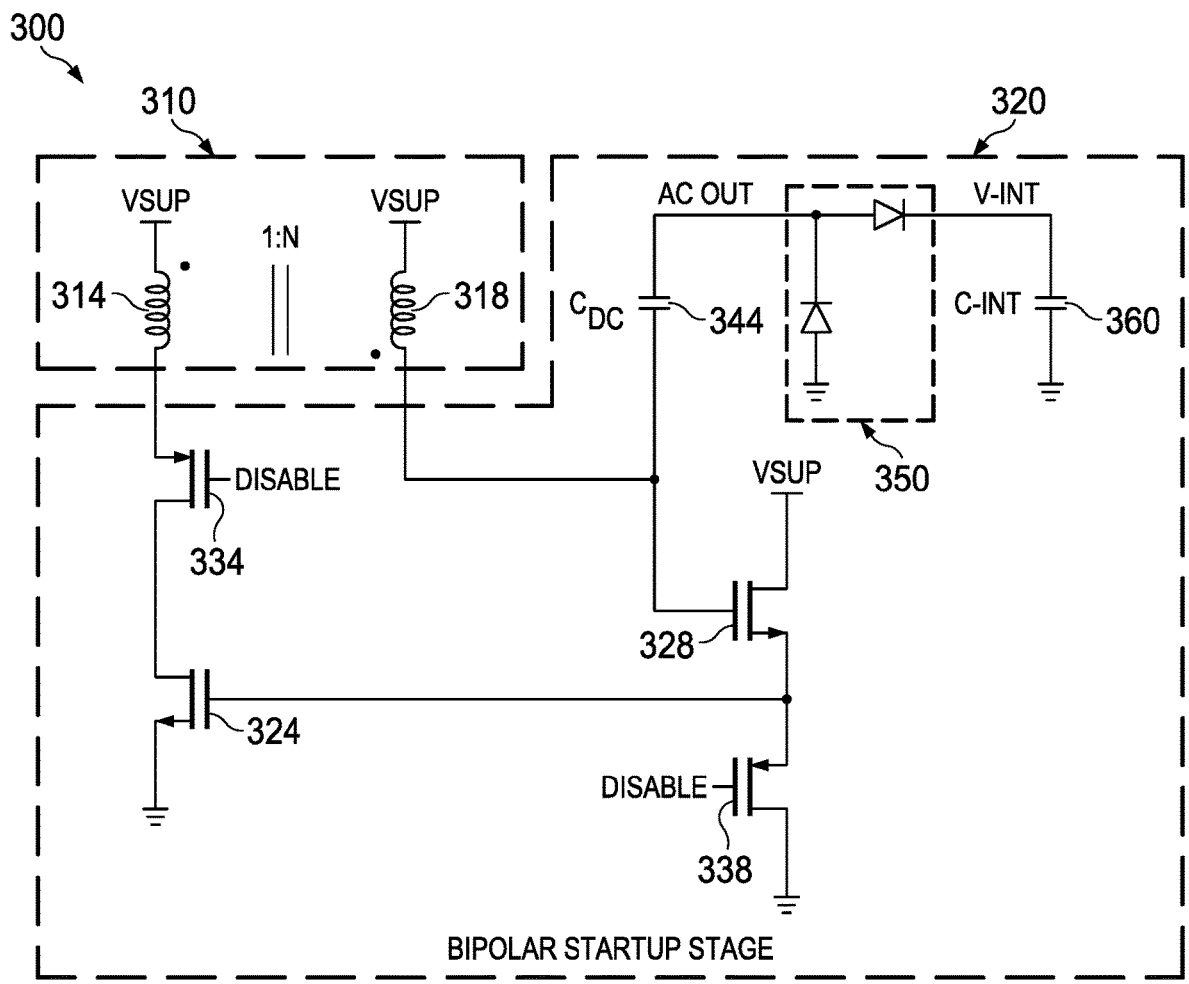
FIG. 3 illustrates an example of a bipolar startup stage that can be employed for the bipolar startup and boost converter circuit depicted in FIG. 1.

FIG. 3 illustrates an example of a bipolar startup circuit 300 that can be employed in the bipolar startup stage 114 and boost converter circuit 100 depicted in FIG. 1. The circuit 300 includes a transformer 310 configured with a primary winding 314 and a secondary winding 318 that are driven from a voltage (VSUP) supplied by a thermoelectric generator (TEG) (not shown). A bipolar startup stage (BSS) 320 is operatively coupled to the transformer 310 to generate an intermediate voltage VINT greater than the voltage VSUP supplied by the TEG. A first transistor device 324 is operatively coupled in series with the primary winding 314 of the transformer 310 to form an oscillator circuit with an inductance of the secondary winding 318 when the voltage VSUP supplied by the TEG is positive. A second transistor device 328 is operatively coupled via its gate terminal to the secondary winding 318 of the transformer 310 to enable the oscillator circuit to oscillate when the voltage VSUP supplied by the TEG is negative. In one example, the first transistor 324 and the second transistor 328 are native metal oxide semiconductor devices (e.g., native NMOS) to facilitate efficient operations of the oscillator circuit since native devices are processed to provide very low turn-on thresholds (e.g., 0.01 volts to 0.1 volts). In electronics, a native transistor (or natural transistor) is a variety of the MOS field-effect transistor that is intermediate between enhancement and depletion modes. Most common is the native n-channel MOS transistor.

The BSS 320 includes a first depletion MOS (e.g., PMOS) device 334 operatively coupled in series with the first transistor 324. A second depletion MOS (e.g., PMOS) device 338 is operatively coupled in series with the second transistor 328. The first and second depletion MOS devices 334 and 338 are employed to enable the BSS 320 during a startup phase and to disable the BSS after the startup phase. The first MOS device 334 can be configured as a controllable switch that is on when enabled during the startup phase and when disabled after the startup phase off (e.g., turned on and off by CSCB described above). The second MOS device 338 can be controlled as a linear resistor (e.g., operate MOS device in linear region) during the startup phase and can be disabled after the startup phase. As shown, the BSS 320 also includes a coupling capacitor 344 to couple an AC output voltage from the secondary winding 318 of the transformer 310 to an AC output (AC OUT) of the BSS 320. A rectifier circuit 350 (e.g., half-bridge or full-bridge diode circuit) converts the AC output from the BSS 320 to the DC output voltage VINT for the BSS 320. An intermediate storage capacitor C-INT 360 filters the DC output voltage of the BSS 320 for a subsequent converter stage, such as the flyback converter stage described above (e.g., converter stage 144 of FIG. 1).

As shown, the circuit 300 can employ a single transformer to achieve bipolar startup capability. The start-up can be autonomous (e.g., self-starting) in the absence of a battery or other external power source other than thermoelectric generator that supplies VSUP to the transformer 310. The circuit 300 can achieve bipolar startup by adding an amplifier branch via transistor 328 to the feedback loop from the secondary winding 318 that performs the opposite of transistor 324 in the primary branch. Thus, the transistor 328 acts as a source follower for positive inputs and as a common-source amplifier for negative inputs supplied from VSUP. Hence, when the input VSUP is positive, no additional phase is added to the loop and the oscillations happen, such as in a Meissner oscillator configuration. When the input VSUP is negative, the path provided by transistor 328 adds 180° phase to the loop which completes the phase requirement for oscillation of the BSS 320. In some examples, where turn-off and turn-on capability are not needed, the BSS 320 can operate without transistor devices 334 and 338 which would be replaced by a conductor across the drain and source locations of transistor device 334 and replaced by a resistor which would connect the drain and source locations of transistor 338. The same transformer 310 can also be employed to operate the flyback converter which is described below with respect to FIG. 5.

Figure 4:
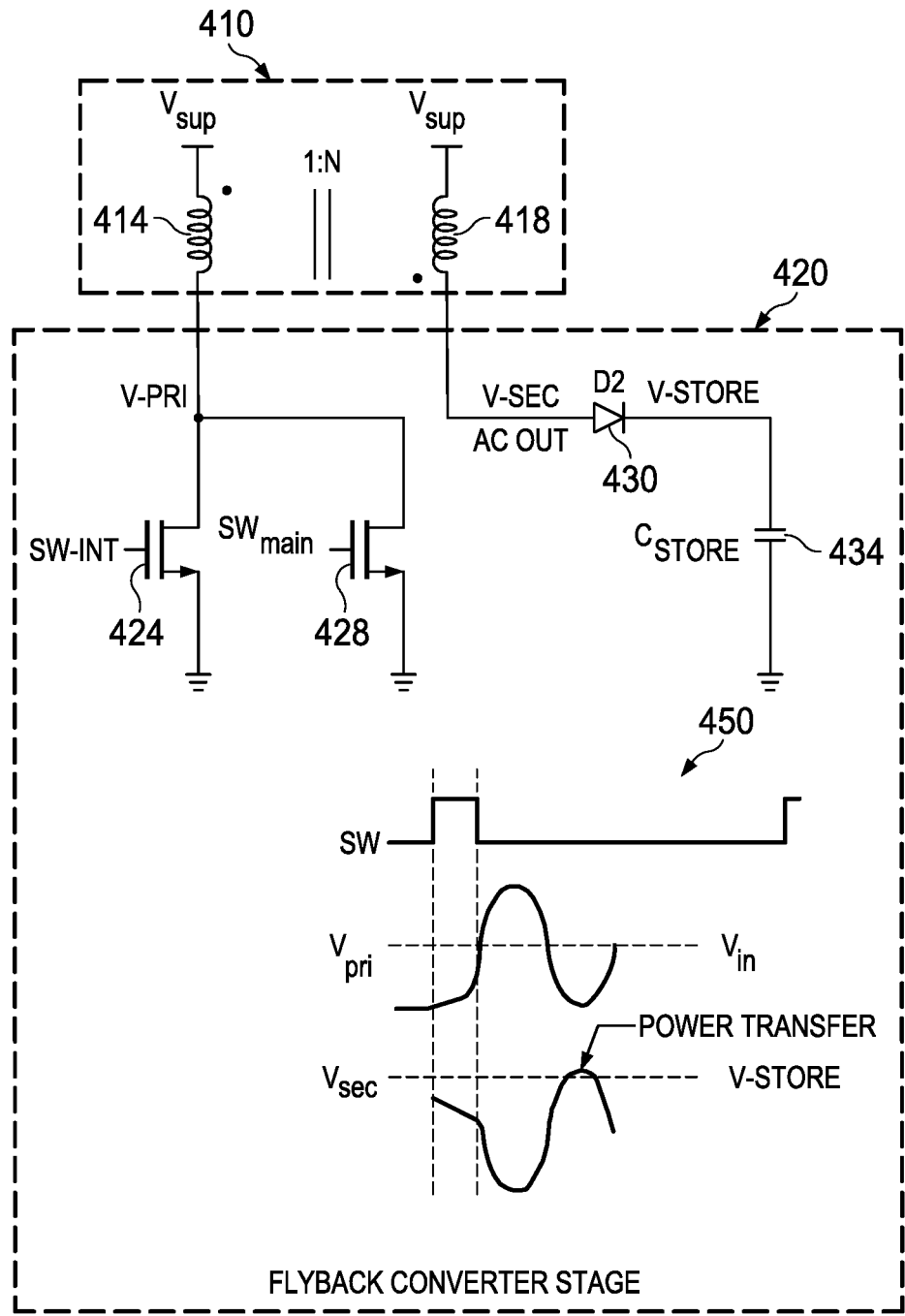
FIG. 4 illustrates an example of a flyback converter stage that can be employed for the bipolar startup and boost converter circuit depicted in FIG. 1.

FIG. 4 illustrates an example of a flyback converter circuit 400 that can be employed in the bipolar startup and boost converter circuit depicted in FIG. 1. A transformer 410 is configured with a primary winding 414 and a secondary winding 418 that are driven from a voltage (VSUP) supplied by a thermoelectric generator (TEG) (not shown). A flyback converter stage (FCS) 420 is operatively coupled to the transformer 410 to generate an output voltage (V-STORE) greater than the voltage supplied by the TEG. The FCS includes a first transistor device 424 having a first turn-on threshold is operatively coupled in series with the primary winding 414 of the transformer 410. The first transistor 424 is employed to excite the primary winding 414 and to generate an AC output on the secondary winding 418 when the regulated output voltage V-STORE is below a predetermined threshold. A second transistor device 428 having a second turn-on threshold is operatively coupled in parallel with the first transistor 424. The second transistor 428 is also operatively coupled in series with the primary winding 414 of the transformer 410 to excite the primary winding and to generate an AC output (AC-OUT) on the secondary winding 418 when the regulated output voltage V-STORE is above the predetermined threshold. The transistor 424 is driven by SW-INT supplied by the ring oscillator described above. The transistor 428 is driven from an output SW-MAIN supplied by the main control block described above.

The first turn-on threshold of the first transistor 424 is lower than the second turn-on threshold of the second transistor 428. The lower threshold turn-on for the first transistor 424 supports a low output voltage from the ring oscillator during startup. However, the lower threshold is not as efficient when the output V-STORE approaches a regulation threshold set for V-STORE. Thus, after the regulation threshold has been achieved for V-STORE, the second transistor 428 having the higher turn-on threshold can be employed to operate the FCS 420. The higher threshold for the second transistor 428 facilitates higher efficiency in the FCS 420.

As shown, the FCS 420 also includes a rectifier 430 (e.g., diode) to convert the AC output from the secondary winding of the transformer to a DC output V-STORE of the FCS 420. A storage capacitor C-STORE 434 filters the DC output of the FCS 420 and stores electrical energy supplied from the rectifier. As will be illustrated and described below with respect to FIG. 6, the FCS 420 can also include a sense circuit operatively coupled to the secondary winding 418 of the transformer 410 to detect a power level of the FCS 420. A power control circuit can monitor the sense circuit and periodically cycle the FCS 420 if the detected power level drops below a predetermined threshold.

A signal diagram at 450 illustrates how flux commutation operates within the flyback converter stage 420. Transformers employed for typical thermal harvesting applications generally have large turns ratios and thus large primary winding capacitances (e.g., for a turns ratio of 1:100, a primary winding capacitance of 84 nF). Due to this large parasitic capacitance on the primary 414, the node V-PRI on the primary cannot rise a diode drop above V-STORE, even if a diode was inserted between nodes V-PRI and V-STORE. Thus, when the switch 424 or 428 turns off under a positive supply VSUP, the flux in the transformer core commutates (or changes polarity) as a result of the resonance between the primary winding inductance and its associated parasitic capacitance. This flux commutation can be used to turn on diode D2 at 430 and transfer the energy stored in the transformer core to V-STORE under positive supply VSUP, which would otherwise have required separate diodes for a positive and negative VSUP.

Figure 5:
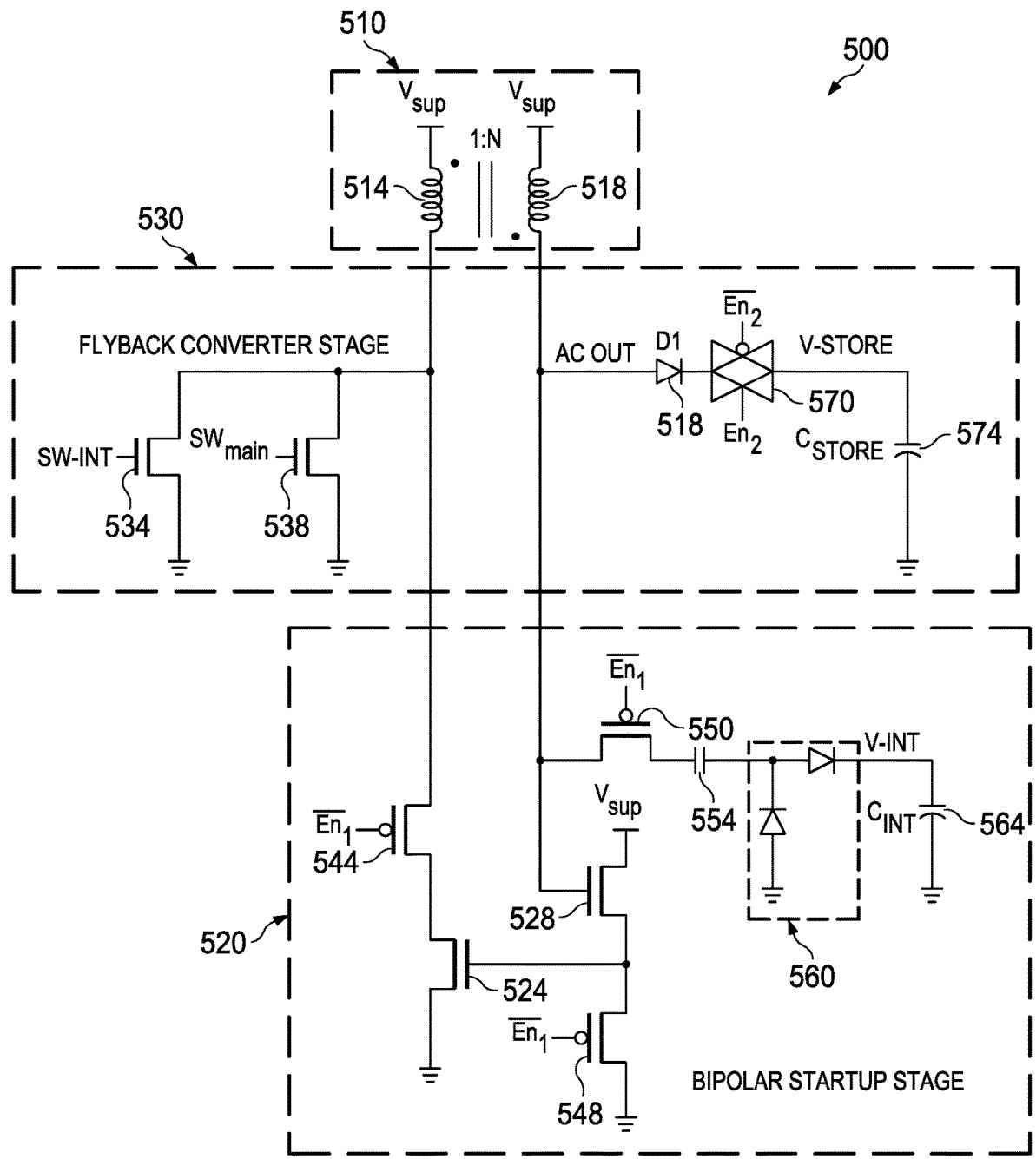
FIG. 5 illustrates an example of a combined bipolar startup and flyback converter circuit that can be employed in the bipolar startup and boost converter circuit depicted in FIG. 1.

FIG. 5 illustrates an example of a combined bipolar startup and flyback converter circuit 500 that can be employed in the bipolar startup and boost converter circuit depicted in FIG. 1. A transformer 510 is configured with a primary winding 514 and a secondary winding 518 that are driven from a voltage (VSUP) supplied by a thermoelectric generator (TEG) (not shown). A bipolar startup stage (BSS) 520 is operatively coupled to the transformer 510 to generate an intermediate voltage VINT greater than the voltage supplied by the TEG. A first transistor 524 is operatively coupled in series with the primary winding 514 of the transformer 510 to form an oscillator circuit with an inductance of the secondary winding 518 when the voltage VSUP supplied by the TEG is positive. A second transistor 528 is operatively coupled in series with the secondary winding 518 of the transformer 510 to enable the oscillator circuit to oscillate when the voltage VSUP supplied by the TEG is negative.

A flyback converter stage (FCS) 530 can be can be operatively coupled to the transformer 510 to generate a regulated output voltage (V-STORE) that is greater than the intermediate voltage V-INT supplied by the BSS 520. A third transistor 534 (e.g., intermediate transistor) having a first turn-on threshold is operatively coupled in series with the primary winding 514 of the transformer 510 to excite the primary winding and to induce an AC output (AC OUT) on the secondary winding when the regulated output voltage V-STORE is below a predetermined threshold. A fourth transistor 538 (e.g., main transistor) having a second turn-on threshold is operatively coupled in parallel with the third transistor 534. The fourth transistor 538 is operatively coupled in series with the primary winding 514 of the transformer 510 to excite the primary winding and to generate an AC output on the secondary winding when the regulated output voltage V-STORE is above the predetermined threshold. As noted in the example above, the first turn-on threshold of the third transistor 534 is lower than the second turn-on threshold of the fourth transistor 538. The lower threshold of transistor 534 supports the ring oscillator on startup whereas the higher threshold of transistor 538 promotes higher efficiency when the FCS 530 attains steady state.

As shown, the BSS 520 can include a first depletion MOS 544 operatively coupled in series with the first transistor 524. A second depletion MOS 548 can be operatively coupled in series with the second transistor 524. The first and second MOS devices are employed to enable the BSS during a startup phase and to disable the BSS after the startup phase (e.g., via En signals supplied by cold start control block). The first MOS 544 is configured as a controllable switch that is on when enabled during the startup phase and off when disabled after the startup phase. The second MOS 548 is controlled as a linear resistor during the startup phase and is disabled after the startup phase. The BSS 520 can also include an isolation switch 550 to isolate V-INT when the FCS 530 is operating. Similar to the circuit described above with respect to FIG. 3, the BSS 520 can also include a coupling capacitor 554, a rectifier circuit 560, and intermediate storage capacitor C-INT 564.

An isolation switch 570 can be provided in the FCS 530 to isolate C-STORE 574 when the BSS is operating during start-up and before the V-INT threshold has been attained. Control signal En1 is employed to control transistors 544, 548, and 550 in the BSS 520. Control signal En2 and its compliment/En2 are employed to control isolation switch 570. The control signals En1 and En2 can be generated by a cold start control block 120 previously described with respect to FIG. 1. A rectifier 580 in the FCS 530 rectifies AC OUT from the secondary 518 which is supplied as a DC output to C-STORE 574 via switch 570.

As shown above with respect to FIG. 1, a cold start control block (CSCB) (not shown) can monitor the intermediate output voltage V-INT of the BSS 520 during the startup phase and enables the first MOS 544 and the second MOS 548 when the intermediate output voltage V-INT is below a predetermined threshold. The CSCB disables the first MOS 544 and the second MOS 548 when the intermediate output voltage V-INT is above the predetermined threshold. A ring oscillator not shown) can be enabled by the CSCB to operate the third transistor 534 during an intermediate converter phase. A main control block (MCB) (not shown) cycles the fourth transistor 538 after the intermediate converter phase. A sub-regulator (not shown) can be activated by the MCB when the regulated output voltage V-STORE of the FCS attains an intermediate voltage threshold and is deactivated by the MCB when the regulated output voltage of the FCS attains a storage threshold (e.g., 1.8 V). As will be illustrated and described below with respect to FIG. 6, a sense circuit (not shown) can be operatively coupled to the secondary winding 418 of the transformer 510 to detect a power level of the FCS 530. A power control circuit (not shown) monitors the sense circuit to periodically cycle the FCS if the detected power level drops below a predetermined threshold.

Figure 6:
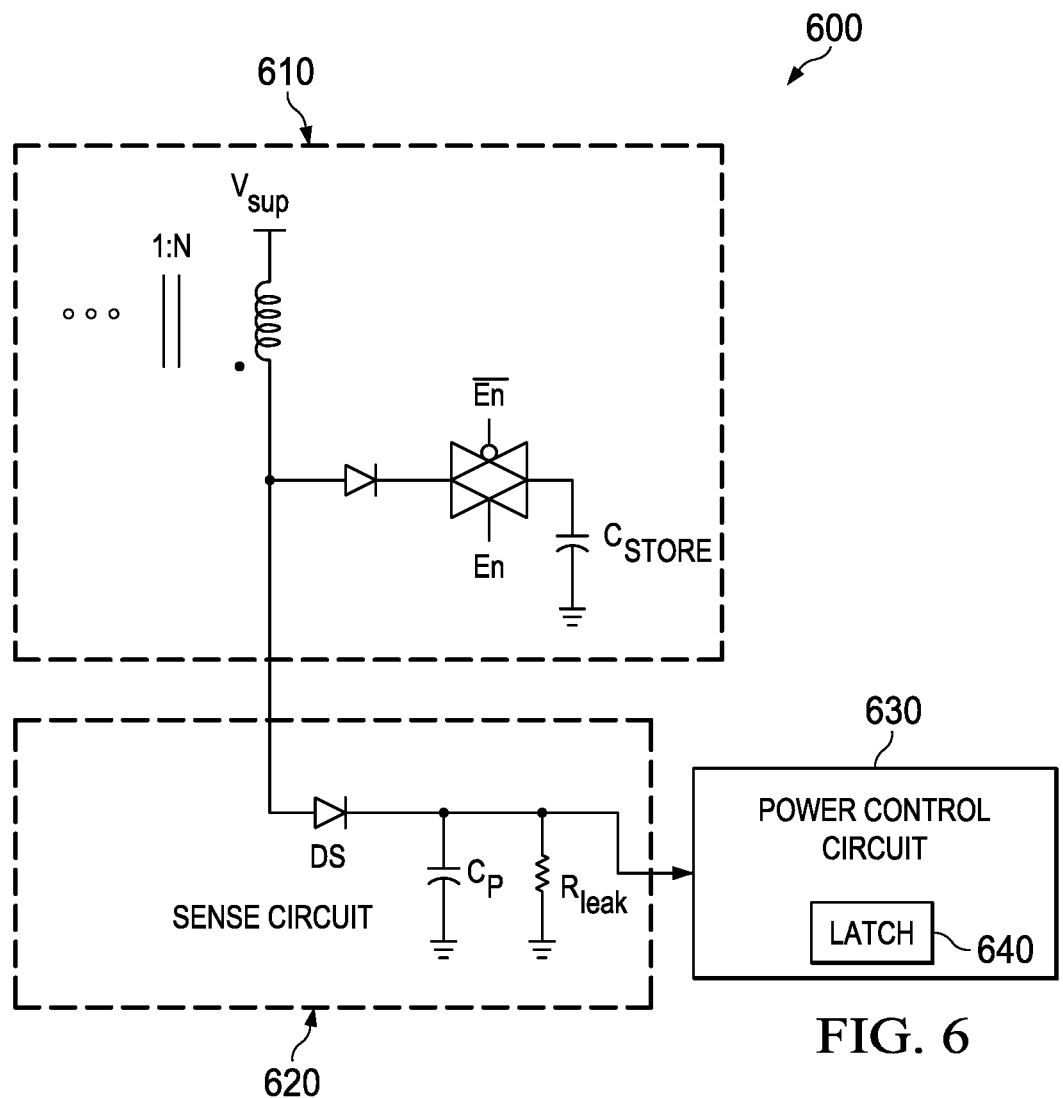
FIG. 6 illustrates a sense and monitor circuit to detect power levels in a flyback converter stage and to cycle the flyback converter stage if the detected power level falls below a predetermined threshold.

FIG. 6 illustrates a sense and monitor circuit 600 to detect power levels in a flyback converter stage and to cycle the flyback converter stage if the detected power level falls below a predetermined threshold. A circuit portion of the FCS stage described above with respect to FIG. 5 is shown at 610. Voltage can be monitored from the secondary of the FCS stage 610 via a sense circuit 620. Output from the sense circuit 620 can be sent to a power control circuit to periodically cycle the FCS stage depending on the detected power levels of the sense circuit 620. In some instances, the thermoelectric energy harvester's output can drop to arbitrarily low power levels depending on the operating conditions. Below a given threshold, for example, the net positive energy harvested by the converter becomes negative, where more energy is consumed in switching and powering the control and sensing circuitry than is harvested. In this instance, it can be beneficial to shut down the converter until more favorable conditions arise (e.g., higher thermal gradients increase the voltage output of the thermal generator).

The main flyback converter can include an on/off detection circuit that periodically checks the status via the sense circuit 620. To detect whether the converter is on, the maximum value of the voltage at the anode of diode DS can be stored on a capacitor Cp in the sense circuit 620. When the converter is on, the voltage stored on the capacitor Cp is a diode drop above V-STORE. A resistor, Rleak, can be placed in parallel to Cp to leak away the stored energy when the diode DS does not turn on. This voltage can be compared against V-STORE using a latch 640 (e.g., a strong-ARM latch), which can be implemented within the power control circuit 630 having a configured input offset that is approximately equal to the value of a diode DS drop.

The latch 640 in the power control circuit 630 signals the converter to be on only if VSUP is above V-STORE by a value greater than the input offset. When the converter is on, the output of the latch can be checked at the 2 kHz system clock frequency, for example, in the power control circuit 630. As a further example, when the converter shuts off, in the absence of adequate power to harvest, typically, only the control circuits that run on the 2 kHz system clock with quiescent current (e.g., 330 nA) remain on. The converter can be turned on for a plurality of (e.g., about 16) cycles every two seconds, for example, by the power control circuit 630 to determine if the thermoelectric harvester is supplying energy. If it is determined as such, the converter can be left on.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An apparatus comprising: a voltage supply terminal; a transformer having a primary winding including a first end connected to the voltage supply terminal, and a secondary winding including a second end connected to the voltage supply terminal; a first transistor connected to a third end of the primary winding, and having a first control terminal; and a second transistor connected between the voltage supply terminal and the first control terminal of the first transistor, the second transistor having a second control terminal connected to a fourth end of the secondary winding.

2. The apparatus of claim 1, wherein the voltage supply terminal is configured to receive a supply voltage from a thermoelectric generator.

3. The apparatus of claim 1, wherein:
the first transistor includes a first NMOS transistor having a first drain node coupled to the third end of the primary winding, a first source node coupled to a ground terminal, and a first gate node as the first control terminal; and
the second transistor includes a second NMOS transistor having a second drain node coupled to the voltage supply terminal, a second source node coupled to the first control terminal of the first transistor, and a second gate node as the second control terminal coupled to the fourth end of the secondary winding.

4. The apparatus of claim 3, further comprising:
a first PMOS transistor coupled between the third end of the primary winding and the first drain node of the first NMOS transistor, the first PMOS transistor having a third gate node configured to receive a disable signal; and
a second PMOS transistor coupled between the second source node of the second NMOS transistor and the ground terminal, the second PMOS transistor having a fourth gate node configured to receive the disable signal.

5. The apparatus of claim 1, further comprising:
a rectifier circuit having an input and an output;
a first capacitor coupled between the fourth end of the secondary winding and the input of the rectifier circuit; and
a second capacitor coupled between the output of the rectifier circuit and a ground terminal.

6. The apparatus of claim 1, wherein the first transistor is configured to form an oscillator circuit with the secondary winding when a supply voltage received by the voltage supply terminal is greater than a ground voltage received from a ground terminal.

7. The apparatus of claim 6, wherein the second transistor is configured to enable the oscillator circuit when the supply voltage received by the voltage supply terminal is less than the ground voltage received from the ground terminal.

8. The apparatus of claim 1, further comprising:
a ring oscillator having an input coupled to receive an intermediate voltage rectified from the fourth end of the secondary winding, and an output;
a third transistor coupled to the third end of the primary winding, and having a third control terminal coupled to the output of the ring oscillator.

9. The apparatus of claim 8, wherein the third transistor is configured to excite the primary winding when a regulated output voltage at a regulated output node is below a predetermined threshold.

10. The apparatus of claim 9, further comprising:
a diode having an anode coupled to the fourth end of the secondary winding, and a cathode coupled to the regulated output node; and
a storage capacitor coupled between the regulated output node and a ground terminal.

11. An apparatus comprising: a voltage supply terminal; a transformer having a primary winding including a first end connected to the voltage supply terminal, and a secondary winding including a second end connected to the voltage supply terminal; a first circuit path connected between a third end of the primary winding and a ground terminal, and configured to form an oscillator circuit based on an inductance of the secondary winding when a supply voltage received by the voltage supply terminal is greater than a ground voltage received from the ground terminal; and a second circuit path connected between a fourth end of the secondary winding and the ground terminal, and configured to enable the oscillator circuit when the supply voltage is less than the ground voltage.

12. The apparatus of claim 11, wherein the voltage supply terminal is configured to receive the supply voltage from a thermoelectric generator.

13. The apparatus of claim 11, wherein:
the first circuit path includes a first transistor configured to conduct a current between the primary winding and the ground terminal based on a control signal; and
the second circuit path includes a second transistor configured to generate the control signal.

14. The apparatus of claim 13, wherein the second transistor is configured as a source follower when the supply voltage is greater than the ground voltage, and the second transistor configured as a common-source amplifier when the supply voltage is less than the ground voltage.

15. The apparatus of claim 11, wherein:
the first circuit path includes a first NMOS transistor having a first drain node coupled to the third end of the primary winding, a first source node coupled to the ground terminal, and a first gate node; and
the second circuit path includes a second NMOS transistor having a second drain node coupled to the voltage supply terminal, a second source node coupled to the first gate node of the first NMOS transistor, and a second gate node coupled to the fourth end of the secondary winding.

16. The apparatus of claim 11, further comprising:
a rectifier circuit having an input and an output;
a first capacitor coupled between the fourth end of the secondary winding and the input of the rectifier circuit; and
a second capacitor coupled between the output of the rectifier circuit and the ground terminal.

17. An apparatus comprising: a voltage supply terminal configured to receive a supply voltage; a transformer having a primary winding including a first end connected to the voltage supply terminal, and a secondary winding including a second end connected to the voltage supply terminal; a startup stage circuit connected to a third end of the primary winding and a fourth end of the secondary winding, and configured to generate an intermediate voltage greater than the supply voltage; a ring oscillator circuit configured to generate an intermediate switching signal based on the intermediate voltage; and a converter stage circuit configured to generate an output voltage, the converter stage circuit having: a first transistor controlled by the intermediate switching signal and configured to excite the primary winding before the output voltage is regulated to reach a predetermined threshold; and a second transistor configured to excite the primary winding when the output voltage is regulated above the predetermined threshold.

18. The apparatus of claim 17, wherein the voltage supply terminal is configured to receive the supply voltage from a thermoelectric generator.

19. The apparatus of claim 17, wherein the startup stage circuit includes:
a first NMOS transistor having a first drain node coupled to the third end of the primary winding, a first source node coupled to a ground terminal, and a first gate node; and
a second NMOS transistor having a second drain node coupled to the voltage supply terminal, a second source node coupled to the first gate node of the first NMOS transistor, and a second gate node coupled to the fourth end of the secondary winding.

20. The apparatus of claim 19, wherein the startup stage circuit includes:
   a rectifier circuit having an input and an output;
   a first capacitor coupled between the fourth end of the secondary winding and the input of the rectifier circuit; and
   a second capacitor coupled between the output of the rectifier circuit and the ground terminal, and configured to store the intermediate voltage.

\* \* \* \* \*